(12) United States Patent
Schoenberg (10) Patent No.: US 9,824,500 B2
(45) Date of Patent: Nov. 21, 2017

(54) VIRTUAL OBJECT PATHING

(71) Applicant: MICROSOFT TECHNOLOGY LICENSING, LLC, Redmond, WA (US)

(72) Inventor: Michael John Schoenberg, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 11 days.

(21) Appl. No.: 15/072,192

(22) Filed: Mar. 16, 2016

(65) Prior Publication Data

US 2017/0270711 A1    Sep. 21, 2017

(51) Int. Cl.
| | |
|---|---|
| *G09G 5/00* | (2006.01) |
| *G06T 19/00* | (2011.01) |
| *G06T 7/00* | (2017.01) |
| *G06T 7/20* | (2017.01) |
| *G02B 27/01* | (2006.01) |

(52) U.S. Cl.
CPC .......... *G06T 19/006* (2013.01); *G02B 27/017* (2013.01); *G06T 7/004* (2013.01); *G06T 7/0075* (2013.01); *G06T 7/20* (2013.01); *G02B 2027/014* (2013.01); *G02B 2027/0138* (2013.01); *G06T 2200/04* (2013.01)

(58) Field of Classification Search
None
See application file for complete search history.

(56) References Cited

U.S. PATENT DOCUMENTS

| 6,914,600 B2 | 7/2005 | Malzbender et al. |
|---|---|---|
| 7,889,195 B2 | 2/2011 | Shih et al. |
| 8,585,476 B2 | 11/2013 | Mullen |

(Continued)

FOREIGN PATENT DOCUMENTS

WO    2014146668 A2    9/2014

OTHER PUBLICATIONS

"A couple of notes about Z", Published on: Apr. 21, 2009' Available at: http://www.humus.name/index.php?page=Comments&ID=255&start=8.

(Continued)

*Primary Examiner* — Kyle Zhai
(74) *Attorney, Agent, or Firm* — Alleman Hall Creasman & Tuttle LLP (57) ABSTRACT

Examples are disclosed for controlling virtual object placement and movement in a physical space as viewed on or through a display. An example method includes receiving a count indicating a number of occupancy transitions over time for a plurality of regions in the physical space, displaying a virtual object in an initial location selected based on the counts for each of the plurality of regions in the physical space, and determining an updated location of the virtual object in the physical space as viewed on or through the display based at least on the initial location of the virtual object and the counts for each of the plurality regions in the physical space. The example method further includes displaying the virtual object in the updated location, the virtual object being controlled to move in the physical space based at least on movements of physical objects through the physical space.

20 Claims, 6 Drawing Sheets

(56) References Cited

U.S. PATENT DOCUMENTS

| | | | |
|---|---|---|---|
| 8,861,839 | B2 | 10/2014 | Leyvand et al. |
| 8,933,970 | B2 | 1/2015 | Saklatvala et al. |
| 9,013,396 | B2 | 4/2015 | Lewis et al. |
| 9,039,528 | B2 | 5/2015 | Geiss |
| 9,122,053 | B2 | 9/2015 | Geisner et al. |
| 9,132,342 | B2 | 9/2015 | Balachandreswaran et al. |
| 2003/0032484 | A1* | 2/2003 | Ohshima ............... A63F 13/10 463/43 |
| 2007/0171199 | A1 | 7/2007 | Gosselin |
| 2012/0316784 | A1* | 12/2012 | Chrysanthakopoulos G01C 21/206 701/519 |
| 2014/0277757 | A1* | 9/2014 | Wang ............... G05D 23/1927 700/276 |
| 2014/0292807 | A1 | 10/2014 | Raffa et al. |

OTHER PUBLICATIONS

Bell, , et al., "View Management for Virtual and Augmented Reality", In Proceedings of ACM Symposium on User Interface Software and Technology, Nov. 11, 2001, pp. 101-110.

Keller, et al., "Real-time 3D Reconstruction in Dynamic Scenes using Point-based Fusion", In Proceedings of the International Conference on 3D Vision, Jun. 29, 2013, 8 pages.

Niebner, et al., "Real-time 3D Reconstruction at Scale using Voxel Hashing", In Journal of ACM Transactions on Graphics, vol. 32, Issue 6, Nov. 2013, 11 pages.

Xu, et al., "Image Smoothing via L0 Gradient Minimization", In Proceedings of the SIGGRAPH Asia Conference, Dec. 12, 2011, 11 pages.

"Real Time 3D motion tracking for interactive computer simulations", Published on: Jun. 2007 Available at: http://www.imperial.ac.uk/pls/portallive/docs/1/20673697.PDF.

Markovic, et al., "Three-dimensional point-cloud room model for room acoustics simulations", In Proceedings on Meetings on Acoustics, Jun. 2, 2013, pp. 1-7.

Noser, H. et al., "Navigation for Digital Actors Based on Synthetic Vision, Memory, and Learning", In Computer and Graphics, vol. 19, Issue 1, Jan. 1, 1995, 13 pages.

Kuffner, J. et al., "Fast Synthetic Vision, Memory, and Learning Models for Virtual Humans", In Proceedings of IEEE Computer Animation, May 26, 1999, Geneva, Switzerland, 10 pages.

Teizer, J. et al., "Real-Time, Three-Dimensional Object Detection and Modeling in Construction", In Proceedings of 22nd International Symposium on Automation and Robotics in Construction (ISARC), Sep. 11, 2005, Ferrara, Italy, 6 pages.

Sherstyuk, A. et al., "Virtual Roommates: Sampling and Reconstructing Presence in Multiple Shared Spaces", In Handbook of Augmented Reality, Jan. 1, 2011, 20 pages.

"Microsoft Hololens: Fragments", YouTube Website, Available online at https://www.youtube.com/watch?v=m6Wndguve8U, Published online Feb. 29, 2016, 3 pages.

"Microsoft Hololens: Spatial Mapping", YouTube Website, Available online at https://www.youtube.com/watch? v=zff2aQ1RaVo, Published online Feb. 29, 2016, 3 pages.

"Microsoft Hololens: Young Conker", YouTube Website, Available online at https://www.youtube.com/watch?v=uQeOYi3Be5Y, Published online Feb. 29, 2016, 2 pages.

ISA European Patent Office, International Search Report and Written Opinion Issued in PCT Application No. PCT/US2017/021471, Jun. 28, 2017, WIPO, 15 pages.

* cited by examiner

VIRTUAL OBJECT PATHING

BACKGROUND

In augmented and/or virtual reality applications, virtual objects may be displayed so as to appear within and/or interact with a physical environment (e.g., a physical environment in which a viewer is located and/or a representation of the physical environment in which a viewer is located). Some virtual objects may be stationary, while others may move through the physical environment.

DETAILED DESCRIPTION

As described above, augmented reality applications may be configured to present one or more virtual objects within a physical environment and/or space in order to integrate the virtual objects with the physical space. For example, an augmented reality application may control a display (e.g., a see-through display) to add floating text next to a real-world physical object (e.g., as viewed through the see-through display) to describe that object. In another example, an augmented reality application may control a display to present a virtual avatar, such as a virtual character of a game, within a physical space (e.g., as viewed through a see-through display). In this way, the virtual objects may appear to augment, interact with, or move through a real-world physical space. Similar augmentations may be applied to a representation of a physical environment to provide a fully immersive, virtual reality application. For example, a physical environment may be imaged and presented on a display and a virtual object may be displayed within the representation of the physical environment on the display. Examples that are described in relation to augmented reality applications (e.g., where a virtual object is displayed in locations relative to a physical environment as viewed through a see-through display) may also be applicable to virtual reality applications (e.g., where a virtual object is displayed in locations relative to a physical environment as viewed on a display).

The inclusion of virtual objects, such as moving virtual objects, in the real-world space may provide a more immersive and natural user experience when the virtual objects behave similarly to real-world objects in the physical space. Accordingly, the present disclosure provides examples of determining virtual object placement and/or movement in a physical space as viewed on or through a display. The placement and/or movement of the virtual object may be based at least on real-world physical object placement and/or movement in the physical space to provide a realistic user experience.

Objects that are present in a region of physical space may be referred to as "occupying" that region of physical space. Accordingly, changes in occupancy of regions in physical space may indicate movements of physical objects through those regions. As a simplified example, a hallway may include four floor tiles along the length of the hallway. As a human subject walks through the hallway, an occupancy of a region of space on/above the four floor tiles may toggle from being unoccupied (before the human subject enters the hallway) to being occupied (while the human subject traverses the hallway). The occupancy of the region of space on/above the four floor tiles may then toggle from being occupied (while the human subject is traversing the hallway) to being unoccupied (once the human subject has passed beyond the final floor tile). Accordingly, the changes in occupancy (e.g., occupancy transitions between occupied and unoccupied) of the region of space in the hallway may indicate movement through the hallway. A relatively high number of occupancy transitions may indicate frequent movement (e.g., a high traffic area). A low number of occupancy transitions may indicate infrequent or no movement (e.g., a low or no traffic area). Still further, zero occupancy transitions may correspond to a wall, piece of furniture or other stationary object. Such locations of zero occupancy transitions having objects located therein may be marked as occupied in order to prevent collisions of virtual objects with physical objects. Likewise, locations of zero occupancy transitions having no objects located therein may be marked as unoccupied to indicate free space. In some examples, sensor data (e.g., from a noisy sensor) may indicate a relatively high occupancy transition count near edges of objects (e.g., in regions where objects meet free space). Accordingly, to compensate for such noise, sensor data may be adjusted and/or analyzed in light of object placement/recognition and/or based on sensor parameters.

Figure 1:
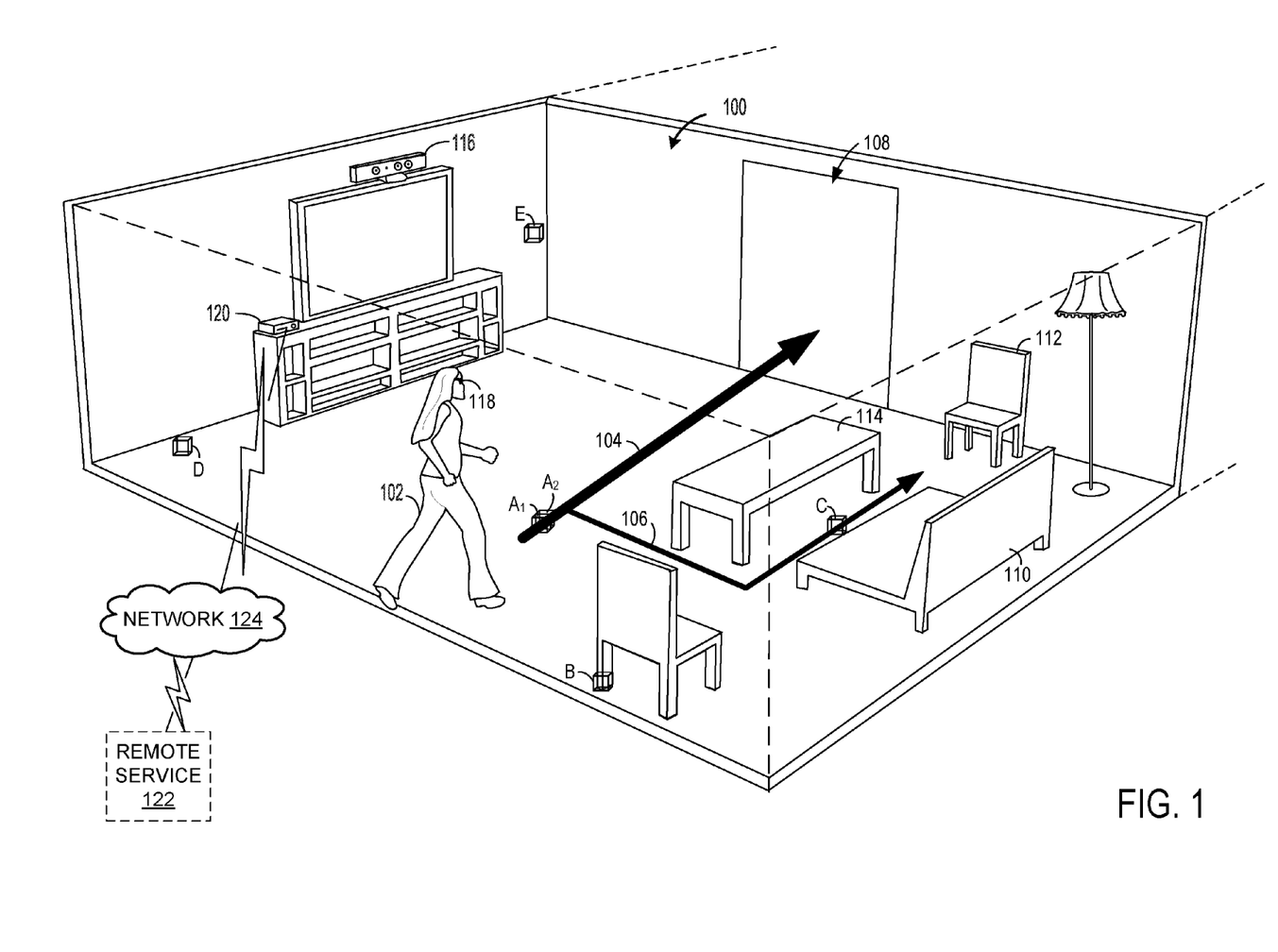
FIG. 1 shows an example physical space through which human subjects and other physical objects may move.

FIG. 1 shows an example physical space 100 through which physical objects, such as human subject 102, may move/traverse. The example illustrated in FIG. 1 represents a room, such as a living room of a house. However, the features disclosed herein may correspond to and/or be used in conjunction with any suitable physical space, including a multi-level building, an outdoor space, and/or other environments.

As illustrated, movements of physical objects, such as human subject 102, through the physical space may often follow one or more paths, such as paths 104 and 106. Specific paths may form due to obstacles in the space (e.g., furniture), destinations within/outside of the space (e.g., places to sit, doorways to other rooms, etc.), and/or other features of the space. For example, path 104 may be a typical pathway through the room to an adjacent room through doorway 108. Path 106 may be a typical pathway through the room to sit on couch 110 and/or chair 112, and may be shaped in a particular way due to the presence of an obstacle such as table 114.

The different relative thicknesses for the arrows representing paths 104 and 106 may indicate different frequencies of movement through the paths (e.g., path 104 may be traversed more often than path 106) and/or different speeds of motion associated with the paths (e.g., a human subject may walk more quickly through path 104 to get to a next room, but more slowly in path 106 to navigate the furniture and/or to eventually sit on chair 112/couch 110).

In order to monitor the physical space 100 to determine movement through the space and/or other space occupancy data, the space may be imaged by one or more imaging devices. The imaging device(s) may image the physical space continuously and/or capture frames at regular or irregular intervals. For example, the physical space may be imaged by a substantially stationary depth camera 116, which may be positioned in order to capture images of multiple regions within physical space 100. Although not shown, additional cameras (e.g., additional depth cameras) may be positioned in the physical space 100 (or outside the physical space, but positioned to capture images of regions in the physical space 100). The fields of view of these additional cameras may be combined with the field of view of depth camera 116 in order to fully image all desired regions of physical space 100. Multiple cameras (e.g., an array of cameras) may also be used in order to image around occluding elements. For example, a first object in front of a first camera may occlude a second object positioned behind the first object. An additional camera having a different orientation and/or field of view may be arranged at a side of the first object, and may thus able to capture an image of the second object.

The physical space 100 may additionally or alternatively be imaged using a mobile imaging device, such as an outward-facing RGB and/or depth camera on a head-mounted display (HMD) device 118 (e.g., worn by human subject 102). HMD 118 may be used to continually scan a physical region in the vicinity of a wearer of the device. As described in more detail below with respect to FIG. 6, regions of the physical space may be identified based on measurements of sensors of the HMD 118 (e.g., GPS, accelerometers/gyroscopes, etc.) and/or processing, such as object recognition.

For either a mobile or a substantially stationary camera/array of cameras, the physical space may be monitored by capturing images (e.g., depth images) of the space and storing data indicating changes in an occupation status of each of a plurality of regions in the physical space. For example, the physical space 100 may be represented by a plurality of three-dimensional points or regions in the space. Each point or region may have a location identifiable via a coordinate system (e.g., using Cartesian, polar, or other coordinate systems) using any appropriate frame of reference. These regions of space may be represented in any suitable format, including a grid of voxels (e.g., three-dimensional pixels and/or three-dimensional representations of regions of the physical space), a point cloud, and/or other representations. Each voxel/point/other representative entity may have one or more values indicating an occupancy and/or occupancy transition count for the associated region of the physical space.

Occupancy of a given region of the physical space may be indicated based on image data gathered by imaging devices such as depth camera 116 and/or HMD 118. For example, a depth image may indicate a depth value (e.g., a distance away from the camera) of an object along a given direction extending away from the depth camera. The corresponding location of the physical space (i.e., at that depth) may thus be identified as being occupied. Regions of the physical space along that direction having smaller depth values (e.g., at shorter distances away from the camera) may be found to be empty. Locations having larger depth values (e.g., at farther distances away from the camera) may also be found to be empty in some implementations. This analysis may be performed for a depth image from a first camera to indicate occupied and empty (non-occupied) regions in the physical space along multiple directions extending away from the camera. Furthermore, the analysis may be repeated for other cameras positioned in different locations in order to determine 1) the occupancy of regions of the physical space outside of the field of view of the first camera and/or 2) the occupancy of regions of the physical space at greater depths (relative to the first camera) than objects imaged by the first camera (e.g., objects that may be occluded from the first camera by other objects in the field of view of the first camera).

The occupancy of a given point/region in space may be determined locally at the depth camera and/or at an associated computing device in some examples. For example, depth camera 116 may send depth image data to computing device 120 for processing to determine the occupancy status of regions in the physical space. Likewise, depth cameras integrated in HMD 118 may send depth images to a processor/storage device integrated in HMD 118 for processing to determine the occupancy status of regions in the physical space. In additional or alternative examples, data from the depth cameras (e.g., directly and/or via computing device 120/HMD 118) may be sent to a remote service 122 (e.g., via a network 124) for processing to determine the occupancy status of regions in the physical space.

The determined occupancy status may be stored in any suitable storage device including 1) a storage device local to and/or associated with the depth camera (e.g., a storage device of the computing device 120 and/or HMD 118) and/or 2) a storage device local to and/or in communication with remote service 122. The stared occupancy status may be tagged with an identifier or otherwise linked to the associated region in physical space. In additional or alternative examples, one or more of the above-described storage device(s) may determine or receive an indication of an occupancy change for the regions of the physical space and store such indication. For example, the occupancy status for a given region of physical space (e.g., based on a depth image being processed) may be compared to a previously-stored occupancy status of that region of the physical space in order to determine if the occupancy status has changed (e.g., from occupied to non-occupied/empty or from non-occupied/empty to occupied). In some examples, an occupancy status may only be identified as being a valid occupancy transition if the occupancy status changes from empty to occupied and then back within a threshold period of time (e.g., indicating that an object moved through that region of space). In other examples, any change of occupancy status may be recorded as a valid occupancy transition.

The occupancy transitions may be stored as values for voxels representing the physical space, as a point cloud representing the physical space, in a table, and/or in any other suitable format. In some examples, the occupancy transitions may be stored as a number of transitions beginning from an established start time/date (e.g., from a first recordation of data for the physical space or after a reset operation). In other examples, the occupancy transition may be stored for a rolling time frame (e.g., occupancy transitions for the last month/day/year/etc.). In some examples, the occupancy transition may be indicated by a counter that is incremented with each valid occupancy change. In other examples, the occupancy transition may be indicated by a probability value, where the probability that the region of space is a path for movement through the space increases with each valid occupancy change. These are but examples—any suitable representation may be used to reflect an amount of occupancy transition.

Referring still to FIG. 1, example regions in space are shown at points $A_1$, $A_2$, B, C, D, and E. For example, points $A_1$ and $A_2$ correspond to two adjacent three-dimensional regions in the physical space 100, each of which are along path 104. Point B corresponds to a region in the physical space that is currently occupied by a piece of furniture (e.g., a chair). Point C corresponds to a region in the physical space that is along path 106. Point D corresponds to a region in the physical space that is empty. While Points $A_1$ through D are all shown as having a bottom surface coplanar with a floor of physical space 100, Point E illustrates an empty region of the physical space above the floor. Each region of the physical space, from floor to ceiling and wall to wall, may be imaged and tracked to determine associated occupancy transitions. In other words, the system in some examples may be implemented to track occupancy and occupancy transitions for the entire three-dimensional volume of the depicted room.

Figure 2:
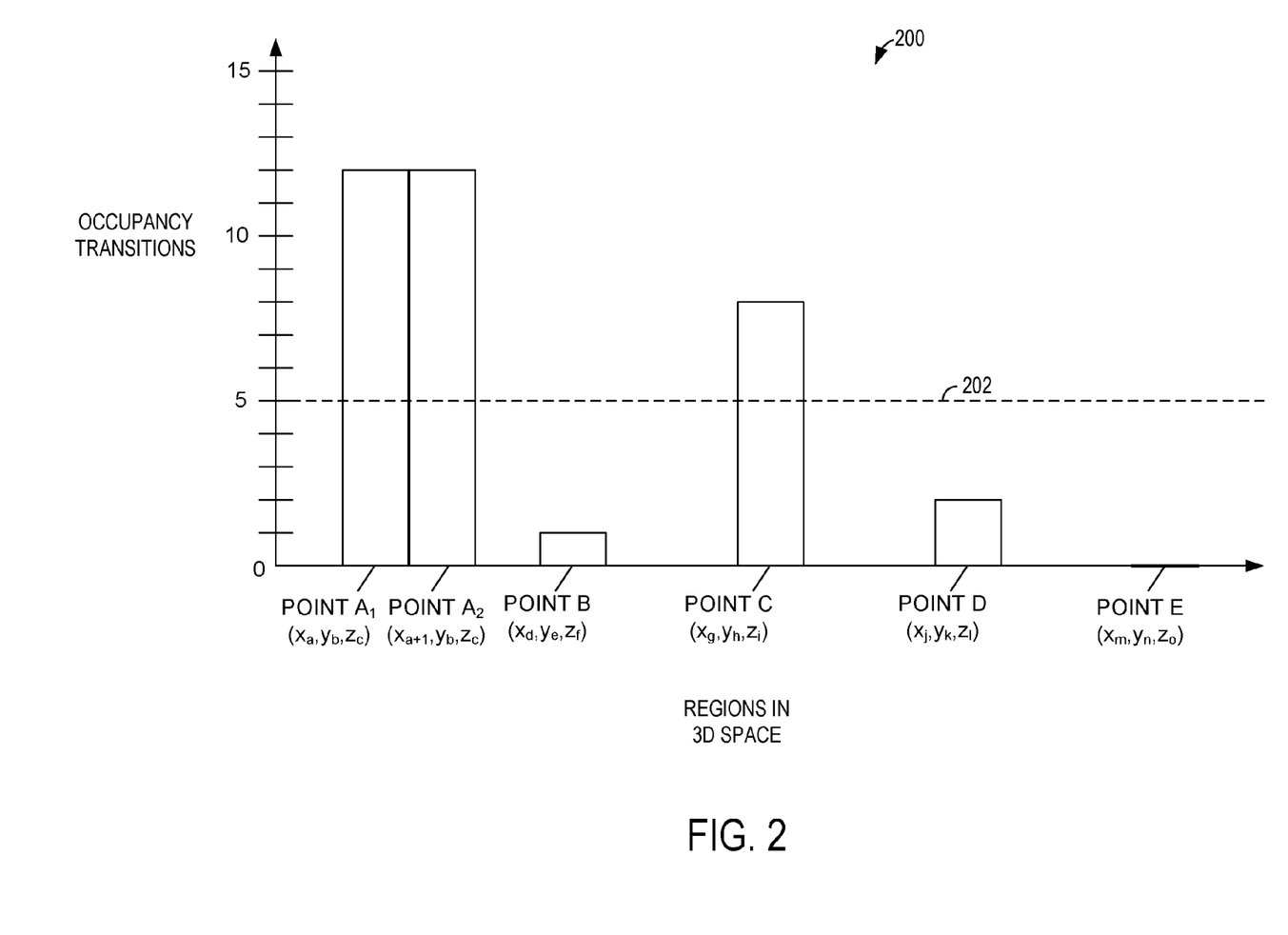
FIG. 2 shows an example histogram of occupancy transitions for sampled regions of the physical space of FIG. 1.

Example occupancy transitions for the illustrated example points in the physical space 100 are shown in graph 200 of FIG. 2. As shown, points $A_1$ and $A_2$ (illustrated with example Cartesian coordinates to show that the points are adjacent along the floor of the physical space) have the same number of occupancy transitions. The relatively high number of occupancy transitions may indicate a relatively high-traffic area in those regions of the physical space (e.g., as illustrated by the relatively thick path 104 of FIG. 1). In contrast, point B is shown to have a relatively low occupancy transition (e.g., 1). For example, the chair occupying point B in FIG. 1 may have been moved into that point after a depth camera began monitoring the physical space, and that movement was recorded as a single occupancy transition.

Point C, which is along path 106 of FIG. 1, has a lower number of occupancy transitions than points $A_1$ and $A_2$, but still has a higher number of occupancy transitions than point B. Point D is shown to have a relatively low number of occupancy transitions (e.g., 2). For example, a human subject may have moved into the location indicated by point D briefly to view a side of computing device 120, and then left the region. Point E is shown to have zero occupancy transitions, as no objects may have moved into/out of the region during the monitoring of the physical space. The numbers of occupancy changes shown in FIG. 2 are simplistic examples provided for illustrative purposes to indicate potential relative measurements for different regions of the physical space. The number of occupancy changes for a given location may be based on a length of time of observation of the physical space, such that, over time, a much higher number of occupancy transitions for regions of the physical space may be observed.

The number of occupancy transitions for a given region of physical space may be compared to a threshold (e.g., a predetermined threshold) in order to determine whether that region is a part of a path of movement through the physical space. The threshold may be expressed in terms of a raw number and/or count of occupancy transitions, a score, a rate of occupancy transitions, a probability (e.g., that the region in space belongs to a path), and/or any other suitable parameter. In the illustrated example, the threshold is represented by line 202 (e.g., approximately 5 occupancy transitions). As shown, Points $A_1$, $A_2$, and C have an associated number of occupancy transitions that are above the threshold, and thus are indicated to be associated with a path of movement, (e.g., paths 104 and 106 of FIG. 1, respectively). Points B, D, and E have an associated number of occupancy transitions that are below the threshold, and thus are not indicated to be associated with a path of movement.

Figure 3:
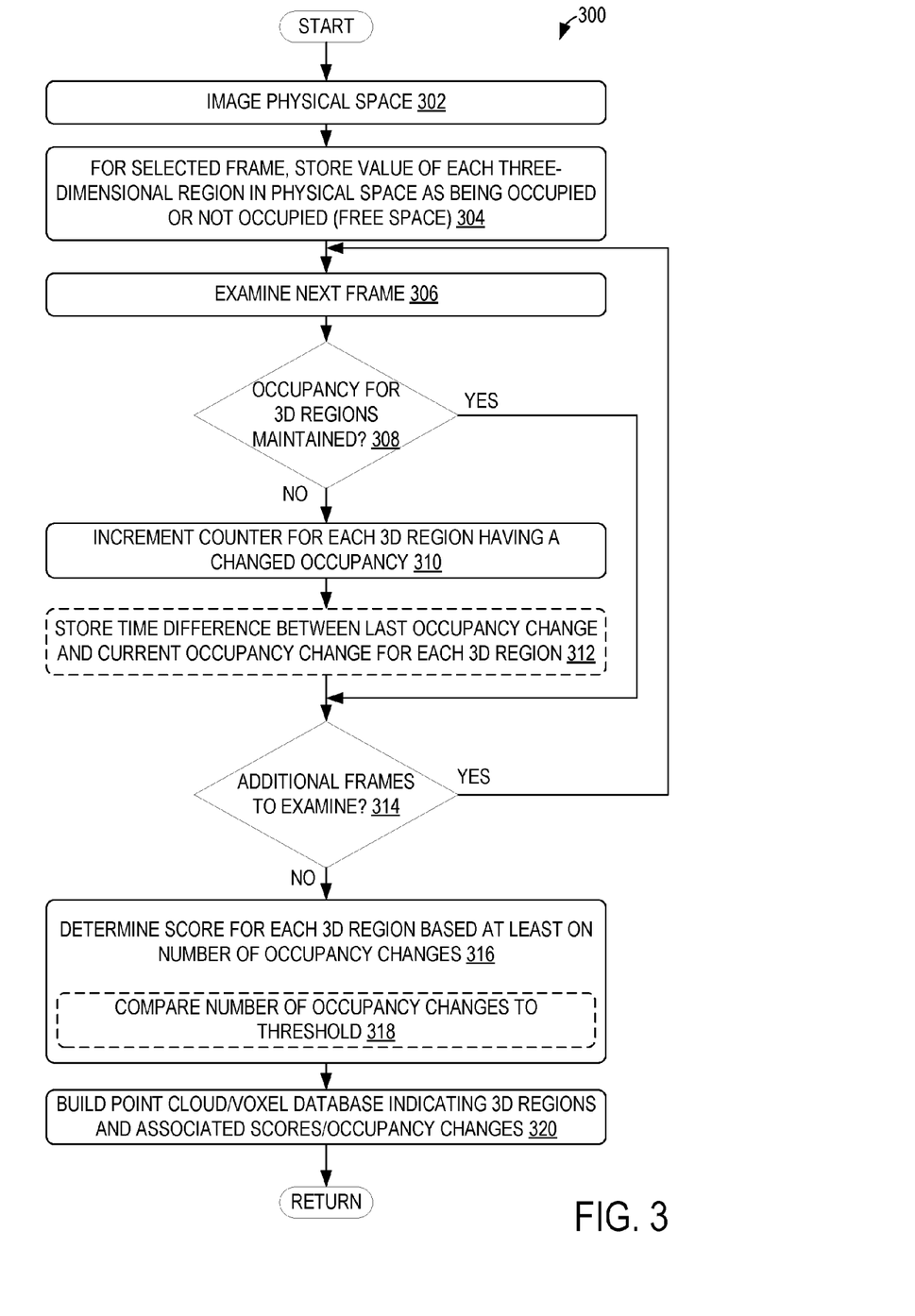
FIG. 3 is a flow chart of a method for monitoring occupancy transitions in a physical space.

FIG. 3 is a flow chart of an example method 300 for monitoring a physical space in order to determine paths of movement through the physical space. As used herein, a path of movement may refer to a plurality of regions in the physical space that exhibit characteristics indicating changes in occupation (e.g., by physical objects) of the regions. For example, the paths may each include a subset of the plurality of regions in the physical space, where each region in the subset is adjacent to at least one other region in the subset. Although referred to as a path of movement, some paths may not experience continuous movement of physical objects therethrough. For example, a given path may have one or more stopping and/or pausing points, at which a physical object may temporarily stop moving (e.g., occupy for a period of time) before continuing along the path. As a real-world example, a path may traverse a room, have a stopping point at a location of a piece of furniture (e.g., a couch), then continue from the stopping point to an exit or other destination point (e.g., a doorway exiting a boundary of the physical space, where the physical space may be bound by the field(s) of view of one or more cameras monitoring the physical space).

Method 300 may be performed using depth camera 116, depth camera of HMD 118, computing device 120, remote service 122, and/or any combination or sub-combination of these devices. At 302, the method includes imaging the physical space. For example, as described above, one or more depth cameras may be used to image the physical space. The method may be performed sequentially for each captured image/image frame, where some blocks may be completed simultaneously for multiple images using multiple processing devices. The imaging performed at 302 may be continuously performed during execution of method 300 in order to continue capturing image frames for processing according to the remaining portions of method 300.

At 304, the method includes, for a selected image frame, storing the value of each three-dimensional region in the physical space as being occupied or not occupied (e.g., empty/free space). For example, the physical space may be divided into regions based on the resolution of the image/imaging device, such that each region occupies a size corresponding to the smallest three-dimensional data point able to be analyzed for the image. Depending on available resources and/or other considerations, resolution may be scaled up or scale down as desired. In examples where the regions are large enough to include multiple data points, the occupancy of the region may be determined based on all of the data points in the region. In one example, the region may be determined to be occupied if any one or more of the data points in the region are occupied. In another example, the region may only be determined to be occupied if an amount of data points in the region greater than a threshold are occupied. In some examples, a timestamp associated with the occupancy determination may be recorded to indicate a time at which the occupancy determination was made.

At 306, the method includes examining a next frame of image data to determine occupancy of regions in the physical space in that frame. At 308, the method includes determining if the occupancy for the three-dimensional regions has been maintained (e.g., if there are changes in occupancy for any of the three-dimensional regions in space). If changes in occupancy are found for at least one three-dimensional region (e.g., "NO" at 308), the method proceeds to 310 to increment a counter (or otherwise increase a representation of occupancy transition) for each three-dimensional region having a changed occupancy. The method may optionally include storing a time difference between a last occupancy change and a current occupancy change for each three-dimensional region, as indicated at 312. With this information, the velocity of movement through the region may be estimated, based on how quickly the occupancy of that region changes (e.g., the rate of change of occupancy transitions).

The method then continues to 314 to determine if additional frames are to be examined (e.g., if all frames for a particular stage of analysis have been examined). If occupancy for the three-dimensional regions has been maintained (e.g., no changes in occupancy were found, "YES" at 308), the method may skip 310 and 312, and go straight to 314 to determine if additional frames are to be examined. If more frames are available for analysis for a given stage of processing (e.g., "NO" at 314), the method returns to 306 to examine a next frame and determine/record occupancy changes in that frame. For example, the analysis of depth images to determine movement and/or interactions of physical objects within the physical space may be performed by examining a plurality of depth images (e.g., sequentially and/or simultaneously). A score may be calculated and/or updated after each image is processed and/or once an occupancy transition has been detected for one or more regions in some examples. In such examples, the method will typically proceed along the "NO" branch of 314, as one image is examined at a time. In other examples, a score may be calculated and/or updated at regular intervals (e.g., periodically in time, after a number of image frames have been processed, after a number of occupancy changes have been detected, and/or any other suitable interval). In such examples, the method may proceed along the "YES" branch of 314 until an image frame is examined that causes the interval to be satisfied (e.g., a set amount of time has elapsed, an set number of image frames have been processed, a set number of occupancy changes have been detected, etc.).

If all available frames have been examined (e.g., "YES" at 314), the method continues to 316 to determine a score for each three-dimensional region based at least on a number of occupancy changes for the different regions. For example, the number of occupancy changes for each region may be compared to a threshold (e.g., as described above with respect to FIG. 2), as indicated at 318. The score may indicate whether the region of space is a part of a path or is not a part of a path of movement through the space (e.g., a score above a threshold may indicate that the region is a part of a path and a score below the threshold may indicate that the region is not a part of any path). In some examples, the score may further indicate a frequency of use of a path, a speed through the path, a length of the path (e.g., based on a number of adjacent regions having a score/occupancy transition count above a threshold), a destination of the path (e.g., an object located at the end of the path), and/or other information. For example, as the frequency and/or speed of a given path increases, the score may increase. In other examples, each region of physical space may be assigned multiple different scores, for example a score indicating whether the region is along a path, a score indicating and based on a frequency of use of the path (e.g., a number of occupancy transitions), a score indicating and based on an average speed of movement through the path, a score indicating and based on a length of the path, etc.

At 320, the method includes building a point cloud, voxel database, or other format of data storage indicating the three-dimensional regions of space and associated scores/occupancy changes. In some examples, features of the physical space may be determined using other sensor devices (e.g., RGB cameras, blueprints, Doppler, etc.). These features may be used to guide the interpretation of data captured by the imaging devices (e.g., to identify areas of free space and target regions to monitor for occupancy changes).

Figure 4:
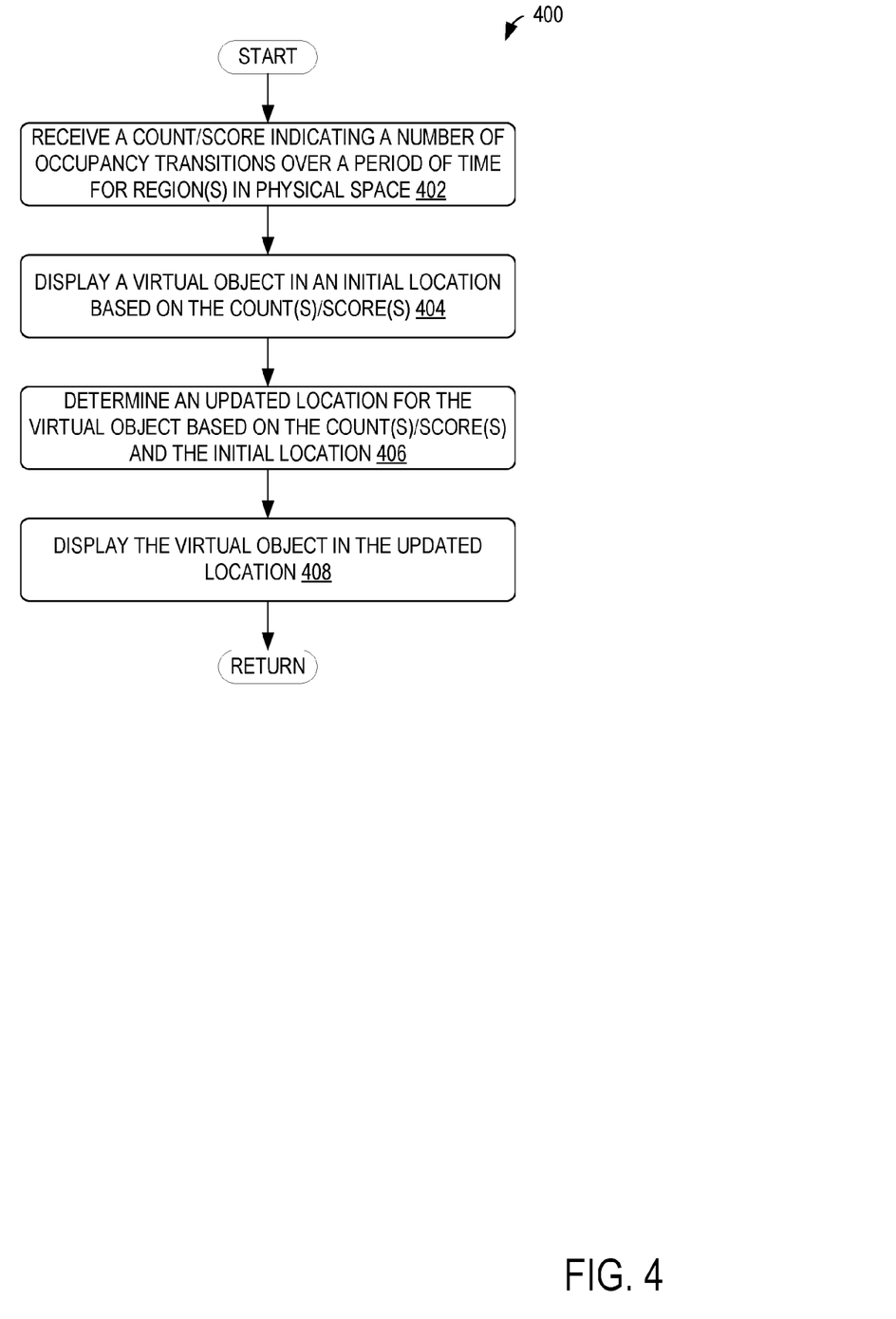
FIG. 4 is a flow chart of a method for displaying a virtual object within a physical space based on occupancy transitions within that physical space.

As discussed above, the flow of movement through a physical space may be used in order to control placement and/or movement of a virtual object in the physical space as a part of an augmented reality experience. For example, moving a virtual character, avatar, or other object through the physical space (as viewed through a see-through display, for example) enables the object to move similarly to a physical human subject, thereby increasing the realism and immersion provided by the augmented reality application. FIG. 4 is a flow chart of an example method 400 for controlling the placement and movement of a virtual object in physical space as viewed on or through a display. At 402, the method includes receiving a count/score indicating a number of occupancy transitions over a period of time for a plurality of regions in the physical space. For example, the count/score may be generated using a method such as method 300 of FIG. 3. The count/score may be dynamically updated, even during execution of method 400, such that locations/movements of virtual objects are based on most-recently observed data.

At 404, the method includes displaying the virtual object in an initial location, the initial location selected based on the counts/scores for each of the plurality of regions in the physical space. For example, the initial location may be selected to be a location of the physical space that is currently unoccupied and is a part of a path of movement. A path of movement may include a subset of the plurality of regions in the physical space, where each region in the subset is adjacent to at least one other region in the subset, and where each region in the subset is associated with a substantially equal number of occupancy transitions.

In some examples, the initial location may be selected to be a part of a path of movement having characteristics/parameters that are aligned with the virtual object and/or the context of the augmented reality application/user. For example, the expected movement speed of the virtual object may be compared to the movement speeds associated with each path in the physical space. Using the example of FIG. 1, if the virtual object is expected to move relatively slowly, the initial location may be selected to occupy a region of the physical space along path 106. Conversely, if the virtual object is expected to move relatively quickly, the initial location may be selected to occupy a region of the physical space along path 104. Similarly, if the virtual object is expected to perform an action, such as sitting, the initial location may be selected to be along path 106, since the path traverses near furniture such as couch 110 and chair 112. Conversely, if the virtual object is expected to walk out of the room and into another room, the initial location may be selected to be along path 104, since the path is directed toward doorway 108. In additional or alternative examples, the path selection may control the movement, actions, and/or other behavior of the virtual object. For example, if the virtual object is positioned on path 104, subsequent movements of the virtual object may have a higher velocity than a virtual object that is positioned on path 106. Similarly, if the virtual object is positioned on path 106, the virtual object may be controlled to sit (e.g., on couch 110) for a period of time before progressing along the path.

The selection of the initial location may additionally or alternatively be based on a type of the virtual object. In this way, a size of the virtual object, an object being represented by the virtual object (e.g., a human, animal, robot, inanimate object, etc.), and/or other features of the virtual object may be used as a parameter when selecting an initial location. For example, a large path or a path surrounded by a large amount of free space may be selected for a relatively large virtual object in order to avoid collisions between the virtual object and physical objects in the physical space. Likewise, the locations of other virtual objects in the augmented reality may be a factor in the selection of an initial location (e.g., a virtual object may be located in a path that is unoccupied by other virtual objects or occupied only by virtual objects moving in a same direction in order to avoid collisions). In this way, features of the virtual object may be mapped to corresponding features of the available paths of movement through the physical space (e.g., a large virtual object may be mapped to a large path, etc.).

At 406, the method includes determining an updated location for a virtual object in the physical space as viewed on or through the display, the updated location of the virtual object being based at least on the initial location of the virtual object in the physical space and the counts/scores for each of the plurality regions in the physical space. For example, the updated location may be selected to be an adjacent region along the path on which the initial location is situated. In this way, the updated location of the virtual object may include one or more updated three-dimensional points in the physical space that are associated with the selected path, at least one of the updated three-dimensional points being 1) different from each of the initial three-dimensional points occupied by the virtual object and 2) adjacent to at least one of the initial three-dimensional points occupied by the virtual object. In some examples, the updated location may not be directly adjacent to the initial location, as the virtual object may be controlled to move through to different regions of space more quickly than the display is updated. In such examples, the updated location may be indirectly adjacent to the initial location (e.g., along the path and adjacent to a region that is directly or indirectly adjacent to the initial location).

At 408, the method includes displaying the virtual object in the updated location of the physical space as viewed on or through the display. In this way, the virtual object may be controlled to move in the physical space based at least on movements of physical objects through the physical space. The physical objects may include human subjects, animals, robots, remote-controlled objects, and/or any other physical objects that may be moved through the space along a path/trajectory. The method may return to a previous block, such as block 406, to determine further updated locations and continue moving the virtual object through the physical space.

Figure 5:
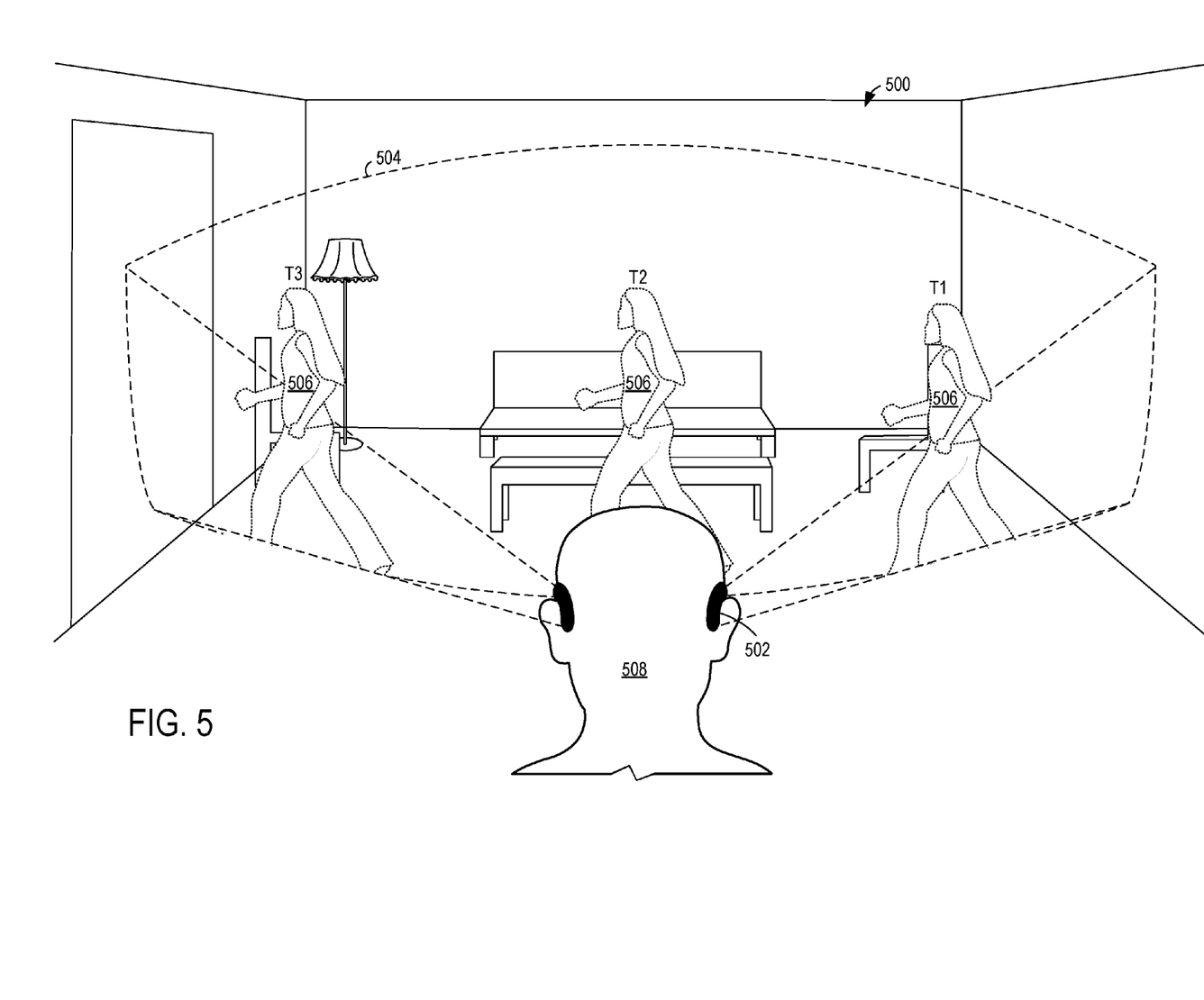
FIG. 5 shows an example presentation of a virtual object moving through a physical space as viewed through a see-through display.

FIG. 5 shows an example view of an augmented reality scene through a see-through display of an HMD 502, where region 504 represents a view of physical space 500 as viewed through the see-through display of HMD 502. As shown, a virtual object, avatar 506 in the illustrated example (e.g., a character of an augmented reality application), may be controlled to move through the physical space in a manner that is similar to the way in which a human subject would move through that physical space. The illustrated example refers to a virtual avatar, however the examples provided herein may be applicable to any virtual object, including but not limited to virtual characters of an application (e.g., humanoids, animals, monsters, vehicles, and/or other objects or representations of objects). At time T1, avatar 506 appears on the right side of HMD user 508, in front of the furniture in the space 500. At time T2 (some time later than time T1), the avatar 506 is moved to an updated location along a path that extends in front of the furniture and in a direction toward a doorway to exit the space 500. At time T3 (some time later than time T2), the avatar 506 is moved to a further updated location along the same path that extends in front of the furniture and in the direction toward the doorway to exit the space 500. The natural movement of the avatar mimics the movement that a human subject might have when travelling through space 500. Although the simple traversal of avatar 506 across the room is provided for illustrative purposes, it is to be understood that the avatar 506 may be controlled to move in a specified direction, at a specified velocity, to avoid obstacles, and/or to stopover or hesitate at particular locations based on features of the path on which the avatar is positioned.

By understanding how humans and other physical object use a physical space, the systems and methods of the present disclosure enable an augmented reality application to present virtual objects that interact with and move through the physical space in a realistic manner. In this way, the augmented reality application may provide an immersive user experience that mimics the user's experience with the real-world physical environment.

Figure 6:
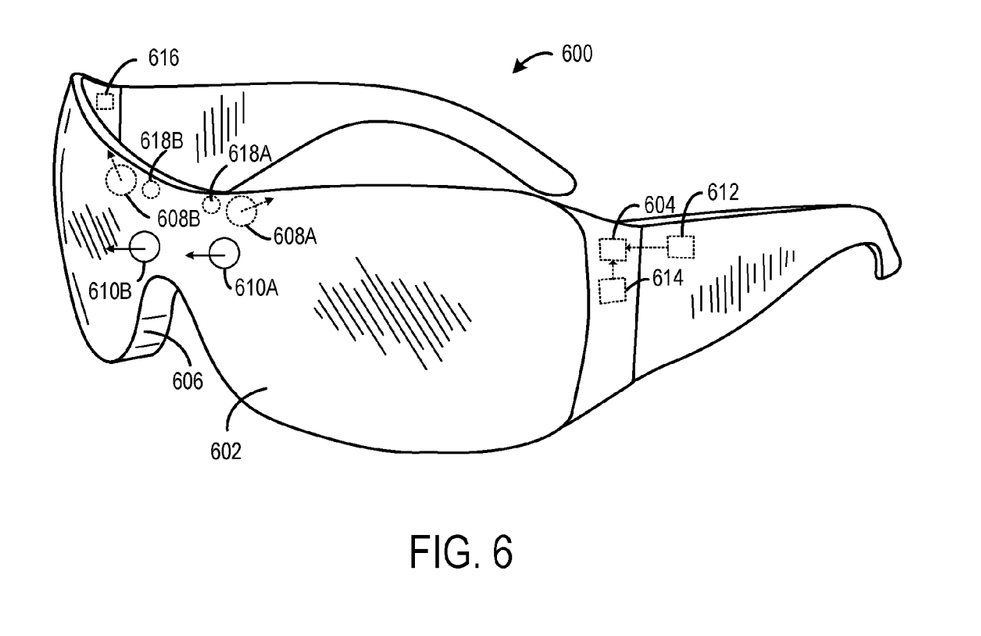
FIG. 6 shows an example head-mounted, see-through display device.

FIG. 6 shows a non-limiting example of a head-mounted, near-eye, see-through display system, also referred to as an HMD 600, in the form of wearable glasses with a see-through display 602. For example, the HMD 600 may be a non-limiting example of the HMD 118 of FIG. 1, the HMD 502 of FIG. 5, and/or computing system 700 of FIG. 7 (described below). An HMD may take any other suitable form in which a transparent, semi-transparent, and/or non-transparent display is supported in front of a viewer's eye or eyes. For example, a non-transparent near-eye display may be positioned in front of a viewer's eye(s) and controlled to display images corresponding to a view in front of the user (e.g., based at least one images captured by a front-facing image sensor in real-time or near real-time). Further, implementations described herein may be used with any other suitable computing device, including but not limited to mobile computing devices, laptop computers, desktop computers, tablet computers, other wearable computers, etc.

The HMD 600 includes a see-through display 602 and a controller 604. The controller 604 may be configured to perform various operations related to eye gaze detection, user input recognition, visual presentation of augmented-reality images on the see-through display 602, and other operation described herein.

The see-through display 602 may enable images such as augmented-reality images (also referred to as augmentation images or holograms) to be delivered to the eyes of a wearer of the HMD 600. The see-through display 602 may be configured to visually augment an appearance of a real-world, physical environment to a wearer viewing the physical environment through the see-through display 602. Any suitable mechanism may be used to display images via the see-through display 602. For example, the see-through display 602 may include image-producing elements located within lenses 606 (such as, for example, a see-through Organic Light-Emitting Diode (OLED) display). As another example, the see-through display 602 may include a display device (such as, for example a liquid crystal on silicon (LCOS) device or OLED microdisplay) located within a frame of HMD 600. In this example, the lenses 606 may serve as, or otherwise include, a light guide for delivering light from the display device to the eyes of a wearer. Such a light guide may enable a wearer to perceive a 3D holographic image located within the physical environment that the wearer is viewing, while also allowing the wearer to directly view physical objects in the physical environment, thus creating a mixed-reality environment. Additionally or alternatively, the see-through display 602 may present left-eye and right-eye augmented-reality images via respective left-eye and right-eye displays.

The HMD 600 may also include various sensors and related systems to provide information to the controller 604. Such sensors may include, but are not limited to, one or more inward facing image sensors 608A and 608B, one or more outward facing image sensors 610A and 610B, an inertial measurement unit (IMU) 614, and one or more microphones 616. The one or more inward facing image sensors 608A, 608B may be configured to acquire image data in the form of gaze tracking data from a wearer's eyes (e.g., sensor 608A may acquire image data for one of the wearer's eye and sensor 608B may acquire image data for the other of the wearer's eye).

The controller 604 of the HMD 600 may be configured to determine gaze directions of each of a wearer's eyes in any suitable manner based on the information received from the image sensors 608A, 608B. For example, one or more light sources 618A, 618B, such as infrared light sources, may be configured to cause a glint of light to reflect from the cornea of each eye of a wearer. The one or more image sensors 608A, 608B may then be configured to capture an image of the wearer's eyes. Images of the glints and of the pupils as determined from image data gathered from the image sensors 608A, 608B may be used by the controller 604 to determine an optical axis of each eye. Using this information, the controller 604 may be configured to determine a direction the wearer is gazing (also referred to as a gaze vector). The controller 604 may be configured to additionally determine an identity of a physical and/or virtual object at which the wearer is gazing by projecting the user's gaze vector onto a 3D model of the surrounding environment. The one or more light sources 618A, 618B, the one or more inward facing image sensors 608a. 608B, and the controller 604 may collectively represent to a gaze detector configured to determine a gaze vector of an eye of a wearer of the HMD 600. In other implementations, a different type of gaze detector/sensor may be employed in the HMD 600 to measure one or more gaze parameters of the user's eyes. Examples of gaze parameters measured by one or more gaze sensors that may be used by the controller 604 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes of the wearer of the HMD 600.

The one or more outward facing image sensors 610A, 610B may be configured to measure physical environment attributes of the physical environment in which the HMD 600 is located (e.g., light intensity). In one example, image sensor 610A may include a visible-light camera configured to collect a visible-light image of a physical space. Further, the image sensor 610B may include a depth camera configured to collect a depth image of a physical space. More particularly, in one example, the depth camera is an infrared time-of-flight depth camera. In another example, the depth camera is an infrared structured light depth camera.

Data from the outward facing image sensors 610A, 610B may be used by the controller 604 to detect movements within a field of view of the see-through display 602, such as gesture-based inputs or other movements performed by a wearer or by a person or physical object within the field of view. In one example, data from the outward facing image sensors 610A, 610B may be used to detect a wearer input performed by the wearer of the HMD, such as a gesture (e.g., a pinching of fingers, closing of a fist, etc.), that indicates a virtual interaction with a user interface visually presented via a display of a computing device in the physical space. Data from the outward facing image sensors 610A, 610B may be used by the controller 604 to determine direction/location and orientation data (e.g., from imaging environmental features) that enables position/motion tracking of the HMD 600 in the real-world environment. Data from the outward facing image sensors 610A, 610B may be used by the controller 604 to construct still images and/or video images of the surrounding environment from the perspective of the HMD 600.

In another example, the HMD 600 may be utilized as a mobile depth imaging device to monitor an environment of a user. For example, data from the outward facing image sensors 610A, 610B may be used to detect occupancy transitions for regions of the physical space in which the user/HMD is located. Data from the outward facing image sensors may be stored such as an occupancy status of a point/region in the three-dimensional physical space that is tagged with an identifier of that point/region in the three-dimensional physical space. The toggling of occupancy status for a given point/region in the three-dimensional physical space may be recognized and used to increase a counter of occupancy transitions for that point/region in the three-dimensional physical space.

The controller 604 may be configured to identify surfaces of the physical space in any suitable manner. In one example, surfaces of the physical space may be identified based on depth maps derived from depth data provide by the depth camera 610B. In another example, the controller 604 may be configured to generate or update a three-dimensional model of the physical using information from outward facing image sensors 610A, 610B. Additionally or alternatively, information from outward facing image sensors 610A, 610B may be communicated to a remote computer responsible for generating and/or updating a model of the physical space. In either case, the relative position and/or orientation of the HMD 600 relative to the physical space may be assessed so that augmented-reality images may be accurately displayed in desired real-world locations with desired orientations. In one example, the controller 604 may be configured to perform simultaneous localization and mapping (SLAM) of a physical space using information provided by a surface sensor, alone or in combination with other sensors of the HMD 600. In particular, the controller 604 may be configured to generate a 3D model of the physical space including surface reconstruction information that may be used to identify surfaces in the physical space.

In some implementations, the HMD 600 may identify different displays of different computing devices in the physical space based on images provided from the outward facing cameras 610A and 610B.

The IMU 614 may be configured to provide position and/or orientation data of the HMD 600 to the controller 604. In one implementation, the IMU 614 may be configured as a three-axis or three-degree of freedom (3DOF) position sensor system. This example position sensor system may, for example, include three gyroscopes to indicate or measure a change in orientation of the HMD 600 within 3D space about three orthogonal axes (e.g., roll, pitch, and yaw). The orientation derived from the sensor signals of the IMU may be used to display, via the see-through display, one or more AR images with a realistic and stable position and orientation.

In another example, the IMU 614 may be configured as a six-axis or six-degree of freedom (6DOF) position sensor system. Such a configuration may include three accelerometers and three gyroscopes to indicate or measure a change in location of the HMD 600 along three orthogonal spatial axes (e.g., x, y, and z) and a change in device orientation about three orthogonal rotation axes (e.g., yaw, pitch, and roll). In some implementations, position and orientation data from the outward facing image sensors 610A. 610B and the IMU 614 may be used in conjunction to determine a position and orientation (or 6DOF pose) of the HMD 600.

The HMD 600 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The HMD 600 may include a communication interface 612 configured to communicate with other computing devices. The communication interface 612 may include any suitable communication componentry including wired and/or wireless communication devices compatible with one or more different communication protocols/standards (e.g., WiFi, Bluetooth). In some implementations, the communication interface 612 may be configured to send control signals to a computing device to adjust operation of the computing device in order to facilitate a virtual interaction of a wearer of the HMD with the computing device.

The controller 604 may include a logic machine and a storage machine, discussed in more detail below with respect to FIG. 7, in communication with the display and the various sensors of the HMD 600.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
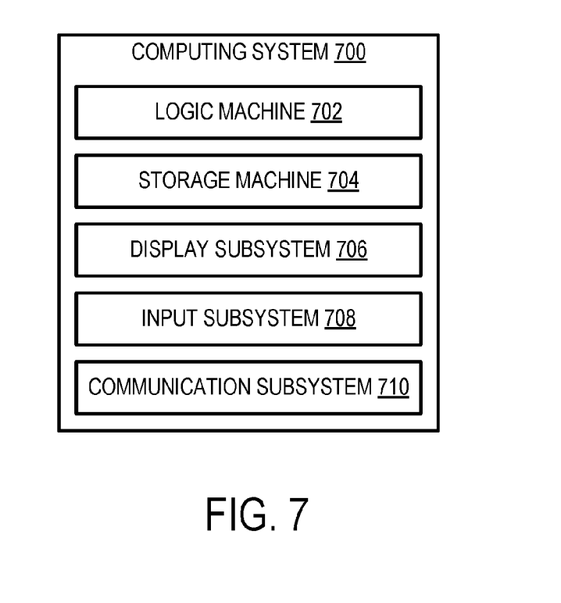
FIG. 7 shows an example computing system.

FIG. 7 schematically shows a non-limiting embodiment of a computing system 700 that can enact one or more of the methods and processes described above. Computing system 700 is shown in simplified form. Computing system 700 may take the form of one or more wearable devices (e.g., a head-mounted display device, such as HMD 600 of FIG. 6), personal computers, server computers (e.g., remote service 122 of FIG. 1), tablet computers, home-entertainment computers, network computing devices, gaming devices (e.g., computing device 120 of FIG. 1), mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology (e.g., sec-through display 602 of FIG. 6 and associated controllers). Such display devices may be combined with logic machine 702 and/or storage machine 704 in a shared enclosure (e.g., within HMD 600 of FIG. 6), or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a method of controlling virtual object placement in a physical space as viewed on or through a display, the method comprising receiving a count indicating a number of occupancy transitions over a period of time for each of a plurality of regions in the physical space, displaying the virtual object in an initial location, the initial location selected based on the counts for each of the plurality of regions in the physical space, determining an updated location of the virtual object in the physical space as viewed on or through the display, the updated location of the virtual object being based at least on the initial location of the virtual object in the physical space and the counts for each of the plurality regions in the physical space, and displaying the virtual object in the updated location of the physical space as viewed on or through the display, the virtual object being controlled to move in the physical space based at least on movements of physical objects through the physical space. The count may additionally or alternatively be generated based on imaging the physical space with one or more depth cameras over at least the period of time. The method may additionally or alternatively further comprise generating a point cloud, and the count for each of the plurality of regions may additionally or alternatively be stored in association with a different three-dimensional point in the physical space. The plurality of regions in the physical space may additionally or alternatively be mapped to a plurality of voxels, and the count for each of the plurality of regions may additionally or alternatively be associated with a different voxel of the plurality of voxels. The display may additionally or alternatively comprise a see-through display of a head-mounted display device. The method may additionally or alternatively further comprise determining a rate of change of occupancy transitions for each of the plurality of regions in the physical space and determining a velocity of movement through the regions in the physical space based on the rate of change. The updated location of the virtual object may additionally or alternatively be further based at least on one or more of a velocity of movement associated with the virtual object and a type of the virtual object, one or more of the velocity of movement associated with the virtual object and the type of the virtual object being mapped to an associated rate of change of occupancy transitions for the plurality of regions in the physical space. The method may additionally or alternatively further comprise determining a path through the physical space, the path comprising a subset of the plurality of regions in the physical space, where each region in the subset is adjacent to at least one other region in the subset, and where each region in the subset is associated with a substantially equal number of occupancy transitions. The updated location of the virtual object may additionally or alternatively be positioned on the path through the physical space, and the method may additionally or alternatively further comprise determining one or more subsequent updated locations of the virtual object positioned along the path through the physical space. The method may additionally or alternatively further comprise, for each of the plurality of regions, determining a score for that region based at least on the count associated with that region, the score indicating whether the count associated with that region is above a predetermined threshold. Any or all of the above-described examples may be combined in any suitable manner in various implementations.

Another example provides a head-mounted display device comprising a near-eye display, a logic device, and a storage device holding instructions executable by the logic device to receive a count indicating a number of occupancy transitions over a period of time for each of a plurality of regions in a physical space, for each of the plurality of regions, determine a score for that region based at least on the count associated with that region and a predetermined threshold, display a virtual object in an initial location, the initial location selected based on the scores for each of the plurality of regions in the physical space, determine an updated location of the virtual object in the physical space as viewed on or through the display, the updated location of the virtual object being based at least on the initial location of the virtual object in the physical space and the scores of each of the plurality regions in the physical space, and display the virtual object in the updated location of the physical space as viewed on or through the display. The head-mounted display device may additionally or alternatively further comprise a depth camera, and receiving the count may additionally or alternatively comprise capturing a plurality of depth images of the physical space using the depth camera over the period of time and tracking the number of occupancy transitions for each of a plurality of voxels of the plurality of depth images. The instructions may additionally or alternatively be further executable to associate each of the plurality of voxels of each of the plurality of depth images with an associated three-dimensional point in the physical space. The instructions may additionally or alternatively be further executable to determine a rate of change of occupancy transitions for each of the plurality of regions in the physical space and determine a velocity of movement through the regions in the physical space based on the rate of change. The updated location of the virtual object may additionally or alternatively be further based at least on one or more of a velocity of movement associated with the virtual object and a type of the virtual object, one or more of the velocity of movement associated with the virtual object and the type of the virtual object being mapped to an associated rate of change of occupancy transitions for the plurality of regions in the physical space. The instructions may additionally or alternatively be further executable to determine a path through the physical space, the path comprising a subset of the plurality of regions in the physical space, where each region in the subset is adjacent to at least one other region in the subset, and where each region in the subset is associated with a substantially equal number of occupancy transitions. The updated location of the virtual object may additionally or alternatively be positioned on the path through the physical space, the method further comprising determining one or more subsequent updated locations of the virtual object positioned along the path through the physical space. Receiving the count may additionally or alternatively comprise one or more of 1) receiving the count from an external computing device and 2) receiving a plurality of depth images from an external depth camera and determining the count based at least on the plurality of depth images. Any or all of the above-described examples may be combined in any suitable manner in various implementations.

Another example provides a method of controlling virtual object placement in a physical space as viewed on or through a display, the method comprising monitoring the physical space over a period of time to determine a count indicating a number of occupancy transitions over a period of time for each of a plurality of three-dimensional points in the physical space, determining one or more paths of movement through the physical space, each path of movement comprising a subset of the plurality of three-dimensional points in the physical space, each three-dimensional point included in the subset being adjacent to at least one other three-dimensional point of the subset, the count associated with each of the three-dimensional points of the subset being above a predetermined threshold, determining a first location of a virtual object in the physical space as viewed on or through the display, the first location including one or more initial three-dimensional points in the physical space that are associated with a selected path of the one or more paths of movement, displaying the virtual object in the first location of the physical space as viewed on or through the display, determining an updated location for the virtual object in the physical space as viewed on or through the display, the updated location of the virtual object including one or more updated three-dimensional points in the physical space that are associated with the selected path, at least one of the updated three-dimensional points being 1) different from each of the initial three-dimensional points and 2) adjacent to at least one of the initial three-dimensional points, and displaying the virtual object in the updated location of the physical space as viewed on or through the display, the virtual object being controlled to move in the physical space based at least on movements of physical objects through the physical space. The display may additionally or alternatively comprise a see-through display included in a head-mounted display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of controlling virtual object placement in a physical space as viewed on or through a display, the method comprising:
   receiving a count indicating a number of occupancy transitions over a period of time for each of a plurality of regions in the physical space;
   displaying the virtual object in an initial location, the initial location selected based on the counts for each of the plurality of regions in the physical space;
   determining an updated location of the virtual object in the physical space as viewed on or through the display, the updated location of the virtual object being based at least on the initial location of the virtual object in the physical space and the counts for each of the plurality regions in the physical space; and
   displaying the virtual object in the updated location of the physical space as viewed on or through the display, the virtual object being controlled to move in the physical space based at least on movements of physical objects through the physical space.

2. The method of claim 1, wherein the count is generated based on imaging the physical space with one or more depth cameras over at least the period of time.

3. The method of claim 2, further comprising generating a point cloud, wherein the count for each of the plurality of regions is stored in association with a different three-dimensional point in the physical space.

4. The method of claim 2, wherein the plurality of regions in the physical space are mapped to a plurality of voxels, and wherein the count for each of the plurality of regions is associated with a different voxel of the plurality of voxels.

5. The method of claim 1, wherein the display comprises a see-through display of a head-mounted display device.

6. The method of claim 1, further comprising determining a rate of change of occupancy transitions for each of the plurality of regions in the physical space and determining a velocity of movement through the regions in the physical space based on the rate of change.

7. The method of claim 6, wherein the updated location of the virtual object is further based at least on one or more of a velocity of movement associated with the virtual object and a type of the virtual object, one or more of the velocity of movement associated with the virtual object and the type of the virtual object being mapped to an associated rate of change of occupancy transitions for the plurality of regions in the physical space.

8. The method of claim 1, further comprising determining a path through the physical space, the path comprising a subset of the plurality of regions in the physical space, where each region in the subset is adjacent to at least one other region in the subset, and where each region in the subset is associated with a substantially equal number of occupancy transitions.

9. The method of claim 8, wherein the updated location of the virtual object is positioned on the path through the physical space, the method further comprising determining one or more subsequent updated locations of the virtual object positioned along the path through the physical space.

10. The method of claim 1, further comprising, for each of the plurality of regions, determining a score for that region based at least on the count associated with that region, the score indicating whether the count associated with that region is above a predetermined threshold.

11. A head-mounted display device comprising:
a near-eye display;
a logic device; and
a storage device holding instructions executable by the logic device to:
receive a count indicating a number of occupancy transitions over a period of time for each of a plurality of regions in a physical space;
for each of the plurality of regions, determine a score for that region based at least on the count associated with that region and a predetermined threshold;
display a virtual object in an initial location, the initial location selected based on the scores for each of the plurality of regions in the physical space;
determine an updated location of the virtual object in the physical space as viewed on or through the display, the updated location of the virtual object being based at least on the initial location of the virtual object in the physical space and the scores of each of the plurality regions in the physical space; and
display the virtual object in the updated location of the physical space as viewed on or through the display.

12. The head-mounted display device of claim 11, the head-mounted display device further comprising a depth camera, wherein receiving the count comprises capturing a plurality of depth images of the physical space using the depth camera over the period of time and tracking the number of occupancy transitions for each of a plurality of voxels of the plurality of depth images.

13. The head-mounted display device of claim 12, wherein the instructions are further executable to associate each of the plurality of voxels of each of the plurality of depth images with an associated three-dimensional point in the physical space.

14. The head-mounted display device of claim 11, the instructions further executable to determine a rate of change of occupancy transitions for each of the plurality of regions in the physical space and determine a velocity of movement through the regions in the physical space based on the rate of change.

15. The head-mounted display device of claim 14, wherein the updated location of the virtual object is further based at least on one or more of a velocity of movement associated with the virtual object and a type of the virtual object, one or more of the velocity of movement associated with the virtual object and the type of the virtual object being mapped to an associated rate of change of occupancy transitions for the plurality of regions in the physical space.

16. The head-mounted display device of claim 11, wherein the instructions are further executable to determine a path through the physical space, the path comprising a subset of the plurality of regions in the physical space, where each region in the subset is adjacent to at least one other region in the subset, and where each region in the subset is associated with a substantially equal number of occupancy transitions.

17. The head-mounted display device of claim 16, wherein the updated location of the virtual object is positioned on the path through the physical space, the method further comprising determining one or more subsequent updated locations of the virtual object positioned along the path through the physical space.

18. The head-mounted display device of claim 11, wherein receiving the count comprises one or more of 1) receiving the count from an external computing device and 2) receiving a plurality of depth images from an external depth camera and determining the count based at least on the plurality of depth images.

19. A method of controlling virtual object placement in a physical space as viewed on or through a display, the method comprising:
monitoring the physical space over a period of time to determine a count indicating a number of occupancy transitions over a period of time for each of a plurality of three-dimensional points in the physical space;
determining one or more paths of movement through the physical space, each path of movement comprising a subset of the plurality of three-dimensional points in the physical space, each three-dimensional point included in the subset being adjacent to at least one other three-dimensional point of the subset, the count associated with each of the three-dimensional points of the subset being above a predetermined threshold;
determining a first location of a virtual object in the physical space as viewed on or through the display, the first location including one or more initial three-dimensional points in the physical space that are associated with a selected path of the one or more paths of movement;
displaying the virtual object in the first location of the physical space as viewed on or through the display;
determining an updated location for the virtual object in the physical space as viewed on or through the display, the updated location of the virtual object including one or more updated three-dimensional points in the physical space that are associated with the selected path, at least one of the updated three-dimensional points being 1) different from each of the initial three-dimensional points and 2) adjacent to at least one of the initial three-dimensional points; and
displaying the virtual object in the updated location of the physical space as viewed on or through the display, the virtual object being controlled to move in the physical space based at least on movements of physical objects through the physical space.

20. The method of claim 19, wherein the display comprises a see-through display included in a head-mounted display device.

* * * * *